Figure 6:
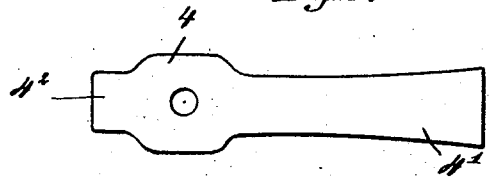

May 4, 1926.
L. SEEGER
WASHER FOR BLOCKING NUTS
Filed Oct. 9, 1923
2 Sheets-Sheet 1
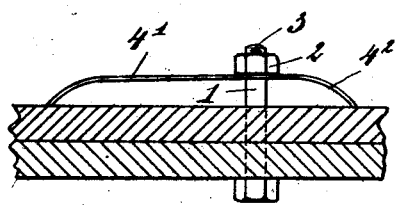
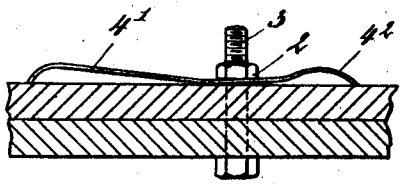
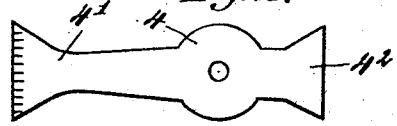
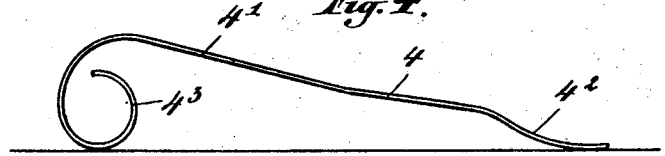
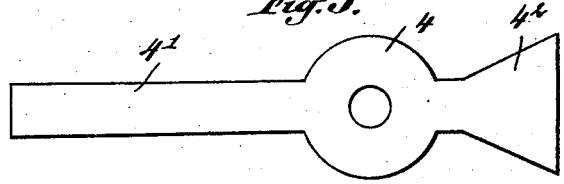
Inventor
L. Seeger
By Marks & Clerk
Attys.

May 4, 1926.

L. SEEGER

WASHER FOR BLOCKING NUTS

Filed Oct. 9, 1923

1,583,015

2 Sheets-Sheet 2

Inventor
L. Seeger
By Marks & Clerk
Attys.

Patented May 4, 1926.

1,583,015

UNITED STATES PATENT OFFICE.

LÉOPOLD SEEGER, OF ROCHEFORT, BELGIUM.

WASHER FOR BLOCKING NUTS.

Application filed October 9, 1923. Serial No. 667,569.

*To all whom it may concern:*

Be it known that I, LÉOPOLD SEEGER, engineer, a subject of the King of Belgium, residing in Rochefort, Belgium, have invented certain new and useful Improvements in Washers for Blocking Nuts; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to means for locking nuts and has for its object to prevent nuts on bolts from working loose, especially the nuts on railway and tramway fishplate bolts.

Numerous devices have been proposed and tried with a view to achieving the purpose mentioned above; but, up to the present, none of these devices has given lasting results. One of the chief causes of nuts working loose is the vibration to which the fastening is exposed, whilst it is often the result of the elongation of the bolt under the action of shock and vibration. For instance, dished washers, rectangular or otherwise, have been proposed with the bolt hole eccentric thereof, also a bowed strip of spring metal with the hole centrally thereof.

According to the invention there is inserted between the nut and the surface against which it is to be tightened, a member which absorbs vibration and shock in such a manner as to keep the nut always in the position it occupied when tightened up. This member consists substantially of a flat spring the length of which is considerable as compared with the dimensions of the nut and which is pierced by a hole for the passage of the stem of the bolt, said hole being eccentric, that is to say, the two supporting arms of said flat spring are of unequal length and rest at their ends or effective ends only, on the surface of the object to be secured. The effect of this last condition is to subject the nut to a reaction which is exerted in an oblique direction relatively to the axis of the stem of the bolt, thus causing the nut to seize on said stem and still further hinder it from working loose. The flexibility of said strip in the axial direction of the bolt, thus prevents the body of the bolt from stretching, the arched portion of the washer playing the part of a shock absorber.

The interposed flat springs may be varied in profile, dimensions and shape, that is to say, these members may vary in accordance with the bolts themselves and with the member to be bolted together.

Another object of the invention consists in providing such a strip which shall be easy to manufacture and of low cost. The machining of this strip may even consist of simple stamping without waste of material especially if the flat spring be of a rectangular profile, or a profile free from sharp re-entrant angles, a form which offers greater strength than other constructional shapes. In fact such re-entrant angles situated in close proximity to the hole for the passage of the bolt may have the effect of weakening the strip in its section perpendicular to said angles.

Figure 7:
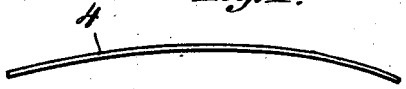
Figure 8:
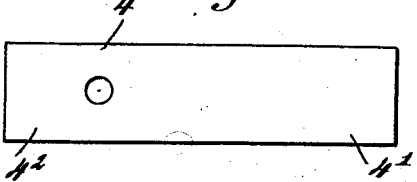
Figure 9:
Figure 10:
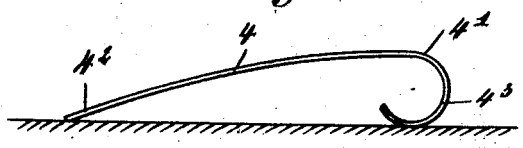
Figure 11:
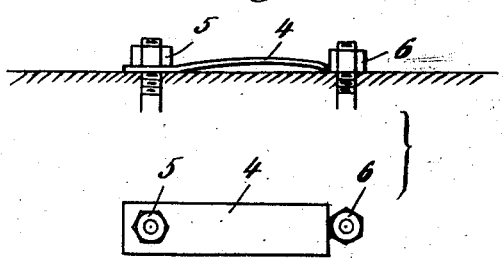

In the accompanying drawings, which illustrate by way of example, several embodiments of the invention Figure 1 is a sectional elevation of a bolt in position for tightening up; Figure 2 is a plan of the inserted strip; Figure 3 is a view similar to Figure 1 with the nut screwed home; Figures 4 and 5 shew in side elevation and plan respectively another form of the inserted strip; Figures 6 and 7 shew respectively a plan and a side elevation of a strip with rounded re-entrant angles; Figures 8 and 9 are similar views of a rectangular strip; Figure 10 shews in side elevation a strip with a curled tip; Figure 11 shews in sectional side elevation and plan an application of the rectangular strip as a retaining member for a second bolt nut.

Referring to the drawings and more especially to Figs. 1 to 3, 1 represents the stem of a bolt; 2 the nut, 3 the threaded part of the stem 1 on which nut engages. Between nut 2 and the adjoining face of the part to be bolted, is imparted a strip of tempered steel or other suitable material pierced with a hole for the passage of the stem 1. This hole is not situated centrally in the longitudinal direction of the strip and the two supporting arms $4^1$ and $4^2$ of the same are therefore of unequal lengths.

After the nut has been screwed home, the strip 4 will be flattened as shown in Fig. 3. The springy strip 4 exerts an upward reaction against the under-face of the nut. On the other hand, owing to the difference of length of the two bearing-arms $4^1$—$4^2$, this stress is exerted obliquely to the longitudinal axis of the stem 1 and locks the nut somewhat more or less obliquely upon the threaded part 3 of stem 1. The strip 4 may be broadened at its ends where it bears against the part to be fastened.

According to Figs. 5 and 4, the strip 4 terminates at one end in a spirally coiled tail $4^3$, an arrangement which increases the elasticity of the strip when the nut has been tightened up.

Referring to Figs. 6 and 7, strip 4, the two arms $4^1$ and $4^2$ of which are of different lengths presents on each side of the bore, an increase of width; these widenings are connected by more or less rounded angles to the other edges of the strip. This has the result of suppressing the lines of lower resistance produced in the strip with sharp inwards-angles, by the sudden changes in the cross-section of the blade.

With reference to Figs. 8 and 9, the spring strip is of rectangular outline, the passage-hole for the bolt being eccentrically bored, so that the two arms $4^1$ and $4^2$ are of unequal length; this strip is bent up in the usual manner. As will be easily understood, this rectangular shape is the simplest form and the easiest to manufacture; the locking-action however is the same as that of the strip having a complicated outline.

Fig. 10 shows a strip in which a larger resiliency is obtained by bending one of the ends in the shape of a hook $4^3$. This blade is similar to the one illustrated in Figs. 4 and 5, but except that the sharp re-entrant angles are suppressed and the strip rests on a sharp edge at $4^2$.

Referring to Fig. 11, the rectangular shaped spring-blade 4 is simultaneously used to lock a second bolt-nut, owing to one of its arms abutting against one of the sides of such such nut; both nuts 5 and 6, when screwed home, being thus locked by one and the same spring-strip 4.

From the foregoing, it will be evident that the interposition of an elastic strip between the nut and the adjacent surface of the object to be secured by the bolt will destroy the effects of vibration, jolting and shocks sustained by the mounting, these influences being absorbed by the elasticity of the interposed strip. This flat spring may be used with any kind of nut and in cases where the surface against which the nut is to be tightened is not large enough to provide a bearing for the spring 4, a bearing plate may be interposed. Such is the case for example with nuts on axle ends.

Claims:

1. Means for preventing nuts from working loose, consisting in interposing between the nut and the adjacent surface of the object to be secured by bolting, an elastic strip the length of which is considerable as compared with the dimensions of the nut and the two arms of which are of unequal length and rest at their ends, only, on the said surface of the object to be secured, said strip being curved in side elevation when in its normal state.

2. An elastic strip as claimed in claim 1, of a rectangular profile having uniform width throughout its length.

3. Means for simultaneously locking two nuts comprising an elastic strip as claimed in claim 1, the end of said strip abutting against one of the lateral faces of the second nut.

4. In a nut lock, the combination with a bolt adapted to be arranged through a piece of work and a nut threaded on the bolt, of a locking device formed from a single strip of metal of rectangular configuration in plan and curved in side elevation and of a length greater than the width of the nut and provided with an opening for engagement with the bolt leaving two arms on the opposite sides of the opening of unequal length which when clamped into engagement with the piece of work by the nut contact only at their terminals with the piece of work.

In witness whereof I have hereunto set my hand.

LÉOPOLD SEEGER.